United States Patent
Michener et al.

(10) Patent No.: US 8,381,279 B2
(45) Date of Patent: Feb. 19, 2013

(54) CONSTRAINING A LOGIN TO A SUBSET OF ACCESS RIGHTS

(75) Inventors: John R. Michener, Sammamish, WA (US); Niels T Ferguson, Redmond, WA (US); Carl M. Ellison, Seattle, WA (US); Josh Benaloh, Redmond, WA (US); Brian A LaMacchia, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1009 days.

(21) Appl. No.: 12/371,464

(22) Filed: Feb. 13, 2009

(65) Prior Publication Data

US 2010/0212002 A1    Aug. 19, 2010

(51) Int. Cl.
*G06F 7/04* (2006.01)
*G06F 15/16* (2006.01)
*G06F 17/30* (2006.01)
*H04L 29/06* (2006.01)

(52) U.S. Cl. ......... 726/7; 726/4; 726/5; 726/17; 726/18; 713/183; 713/184

(58) Field of Classification Search .................. 726/4, 5, 726/7, 17–19, 21
See application file for complete search history.

(56) References Cited

U.S. PATENT DOCUMENTS

| | | | |
|---|---|---|---|
| 7,016,875 B1 | 3/2006 | Steele et al. | |
| 7,058,798 B1 | 6/2006 | Elley et al. | |
| 7,237,257 B1 | 6/2007 | Hirsh | |
| 7,865,950 B2 * | 1/2011 | Lipetz | 726/19 |
| 2004/0025026 A1 * | 2/2004 | Karp et al. | 713/183 |
| 2005/0132203 A1 | 6/2005 | Dharmarajan | |
| 2006/0026667 A1 | 2/2006 | Bhide et al. | |
| 2007/0234042 A1 * | 10/2007 | Gantman et al. | 713/156 |
| 2007/0250920 A1 * | 10/2007 | Lindsay | 726/7 |
| 2008/0046369 A1 | 2/2008 | Wood | |
| 2008/0178270 A1 | 7/2008 | Buss | |
| 2008/0263643 A1 * | 10/2008 | Jaiswal et al. | 726/6 |
| 2010/0174758 A1 * | 7/2010 | Radenkovic et al. | 707/803 |

OTHER PUBLICATIONS

Sutcu, et al., "A Secure Biometric Authentication Scheme based on Robust Hashing", Proceedings of the 7th workshop on Multimedia and security, 2005, New York, retrieved at <<http://isis.poly.edu/~biomet/yagiz05biometric.pdf>>, Aug. 1-2, 2005, pp. 111-116.
"msdn", "User Name Password Validator", retrieved at <<http://msdn.microsoft.com/en-us/library/aa354513.aspx>>, Sep. 23, 2008, pp. 1-4.

* cited by examiner

*Primary Examiner* — Jeffrey Pwu
*Assistant Examiner* — Jayesh Jhaveri
(74) *Attorney, Agent, or Firm* — Wolfe-SBMC

(57) ABSTRACT

This document describes tools that constrain a login to a subset of access rights. In one embodiment, the tools generate a constrained password by executing a cryptographic algorithm on a user ID, general password, and one or more desired constraints. The constrained password is used in place of the general password to gain access rights that are a subset of the access rights that would be granted if the general password were used instead.

20 Claims, 8 Drawing Sheets

CONSTRAINING A LOGIN TO A SUBSET OF ACCESS RIGHTS

BACKGROUND

In conventional computer-based authentication, a user provides a username and password to login to a protected system. Such protected systems include banking websites, shopping websites, personal computers, portable devices, medical-records databases, and email accounts, to name a few.

One typical approach to computer-based authentication uses a separate username and password to authenticate to each protected system. A user wishing to make a transfer of funds between accounts on his banking website, for example, provides a username and password associated with that website. The same user, when wishing to login to his email account, provides a different username and password for access to that system. This approach often results in users having to remember a large number of usernames and passwords. Remembering a large number of usernames and passwords is such a daunting task that many users resort to writing down their passwords, saving their passwords (usually in an insecure manner), or requesting to reset their password each time they revisit to a system. This can be inconvenient and insecure.

Another approach uses a single-sign-on service. By providing authentication through a single-sign-on service, protected systems can provide their users with a single-sign-on username and password for authenticating to multiple systems. Using the previous example, the user wishing to access his banking website can use the same single-sign-on username and password that is used for his email account, thus requiring the user to remember or locate only one username and password. While this is helpful to users, this one username and password is made much more powerful by the use of a single-sign-on service. A malicious actor may gain access to many resources if the username and password are compromised or stolen. As the single-sign-on username and password may give full access to a user's banking website, email, and other resources, all of these systems can be compromised if one username and password is compromised.

SUMMARY

This document describes tools that constrain a login to a subset of access rights. In one embodiment, the tools generate a constrained password by executing a cryptographic algorithm on a user ID, general password, and one or more desired constraints. The constrained password is used in place of the general password to gain access rights that are a subset of the access rights that would be granted if the general password were used instead.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes tools capable of constraining a login to a subset of access rights. The tools may provide a user with a secure way to login to the user's account to gain a subset of access rights rather than a full set of access rights associated with the user's account. For example, a user may login with her username to gain access to her email account without gaining access to her banking website. This can be true even though both the user's email account and banking website share the same single-sign-on username and password through the use of a single-sign-on service.

To do so, the tools may generate a constrained password for use on the device. The constrained password may reduce a security risk by granting a subset rather than full set of access rights associated with the user's account. Furthermore, the tools permit a user to use a constrained password without having to record or remember the constrained password. A user may gain access to a subset of access rights without having to remember a second username or password in addition to the user's single-sign-on username and password. The user may also enjoy enhanced security when using a single-sign-on service or other account granting multiple access rights by reducing the access rights in jeopardy if the device on which the user logged in or the constrained password used to login is compromised.

Example Environment

Figure 1:
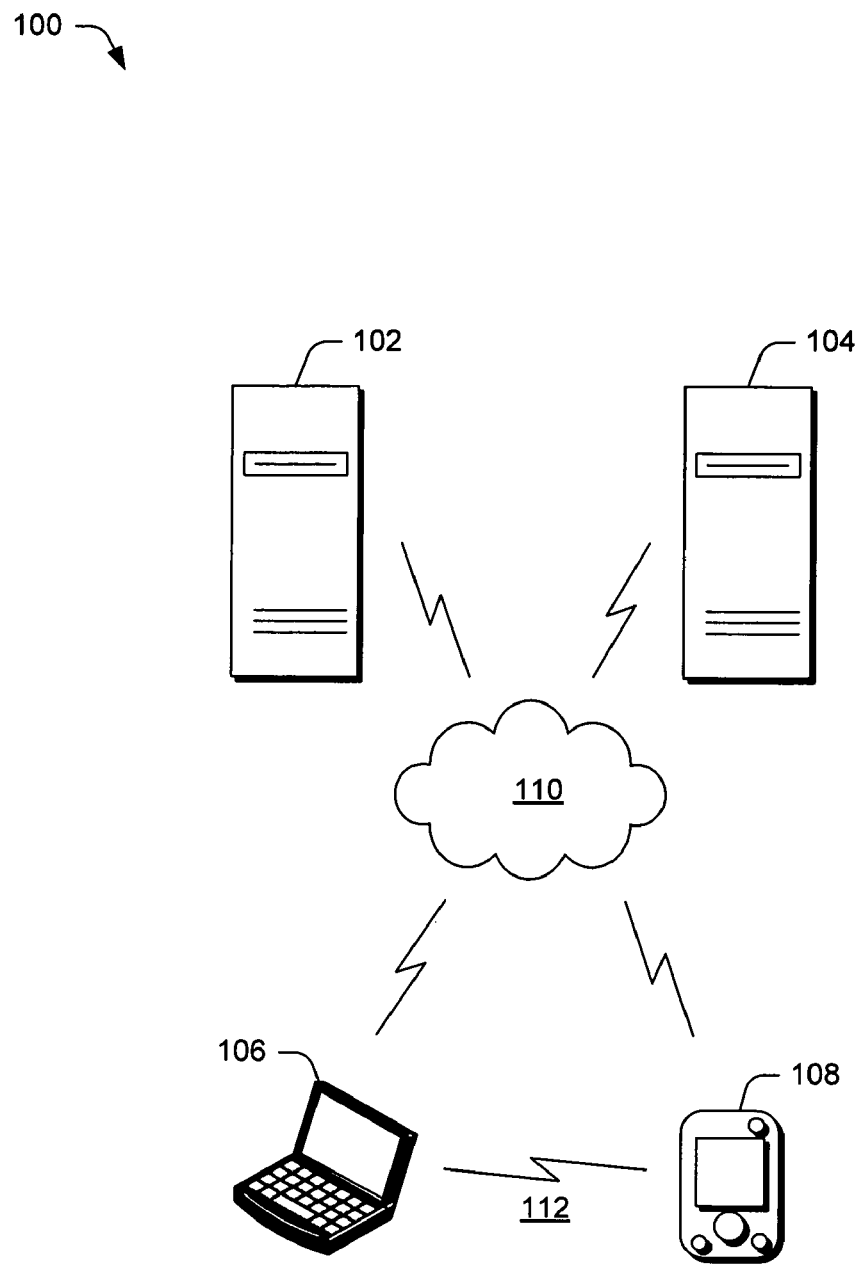
FIG. 1 is an illustration of an environment in which a login may be constrained.

FIG. 1 is an illustration of an environment 100 in an example embodiment in which the tools may operate to enable a computing device, or group of computing devices, to constrain an account login to access rights that are a subset of the account's full access rights. Environment 100 includes a first computing device 102, a second computing device 104, a third computing device 106, and a fourth computing device 108. The computing devices are connected via a communication network 110. The communication network 110 may be any network enabling communication between any two or more of the computing devices, such as the Internet, a local-area network, a wide-area network, a wireless network, a USB hub, a computer bus, or a combination of these. Computing device 106 and computing device 108 are also connected to each other via communication link 112. Communication link 112 can include a direct USB connection, a FireWire connection, or some other communication link, such as communication network 110.

Figure 2:
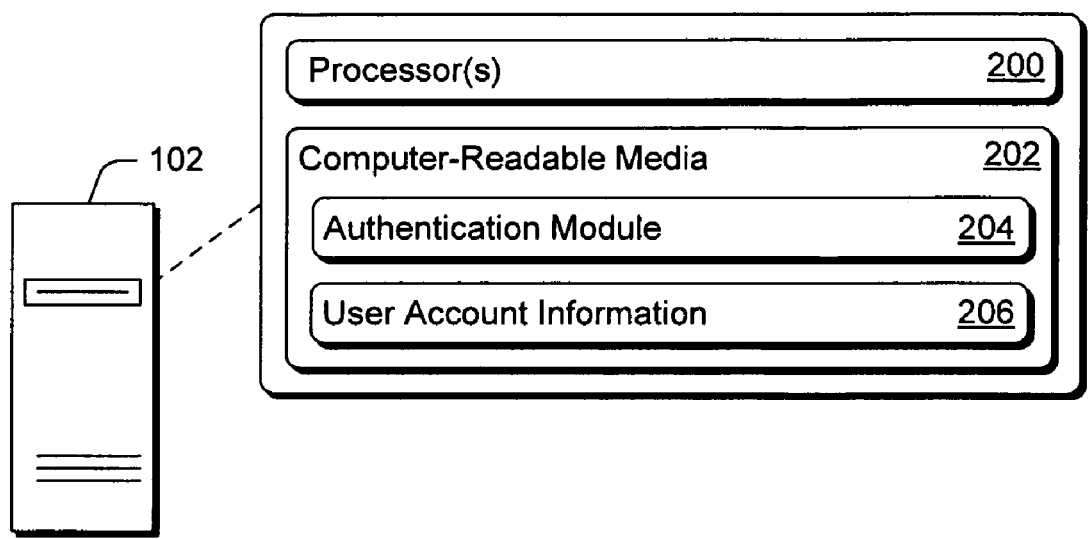
FIG. 2 is a more-detailed illustration of computing devices 102 and 104 of FIG. 1.
Figure 2:
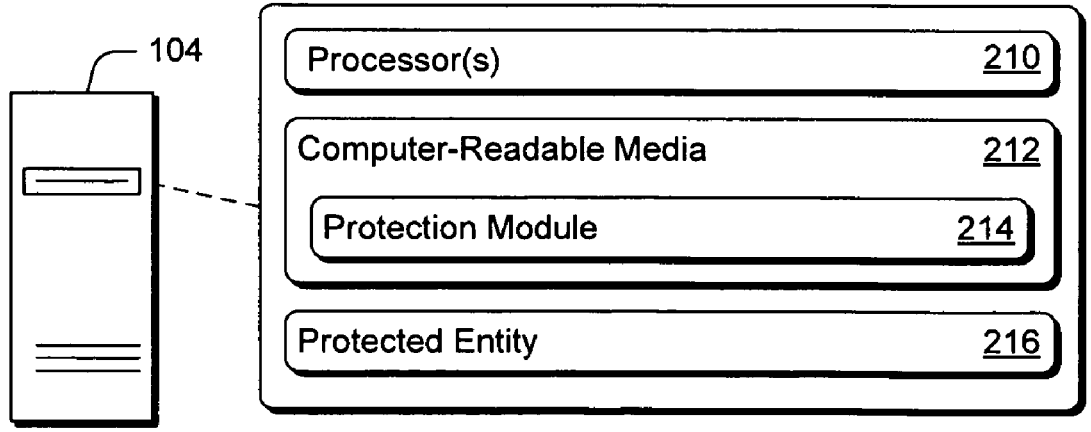

FIG. 2 is a more-detailed illustration of computing devices 102 and 104. Computing device 102 includes one or more processors 200 and computer-readable media 202. Computer-readable media 202 contains or has access to an authentication module 204 and user account information 206. The authentication module 204 is capable of receiving authentication requests from computing devices 106 and/or 108 and responding to the authentication requests by granting or denying a subset or full access based on information provided in the authentication request and the user account information 206.

Computing device 104 includes one or more processors 210, computer-readable media 212 containing a protection module 214, and a protected entity 216. Protection module 214 checks for proper access granted by computing device 102 before allowing access to protected entity (or entities) 216. Protected entity 216 includes computer resources. A few examples of such resources include a bank account, medical records, a product store, and shared files. With access to these resources, a user may, for example, transfer funds between bank accounts, access or modify data files, communicate data over a network, and purchase music from the product store to download to a media player. Protected entity 216 can be contained upon or separate from computer-readable media 212. For instance, in a home automation system, a lamp may not be embodied on a computer-readable medium, though access to turn it on and off most likely will be.

Figure 3:
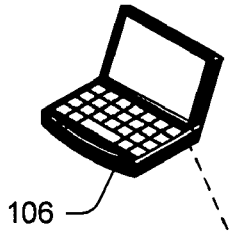
FIG. 3 is a more-detailed illustration of computing devices 106 and 108 of FIG. 1.
Figure 3:
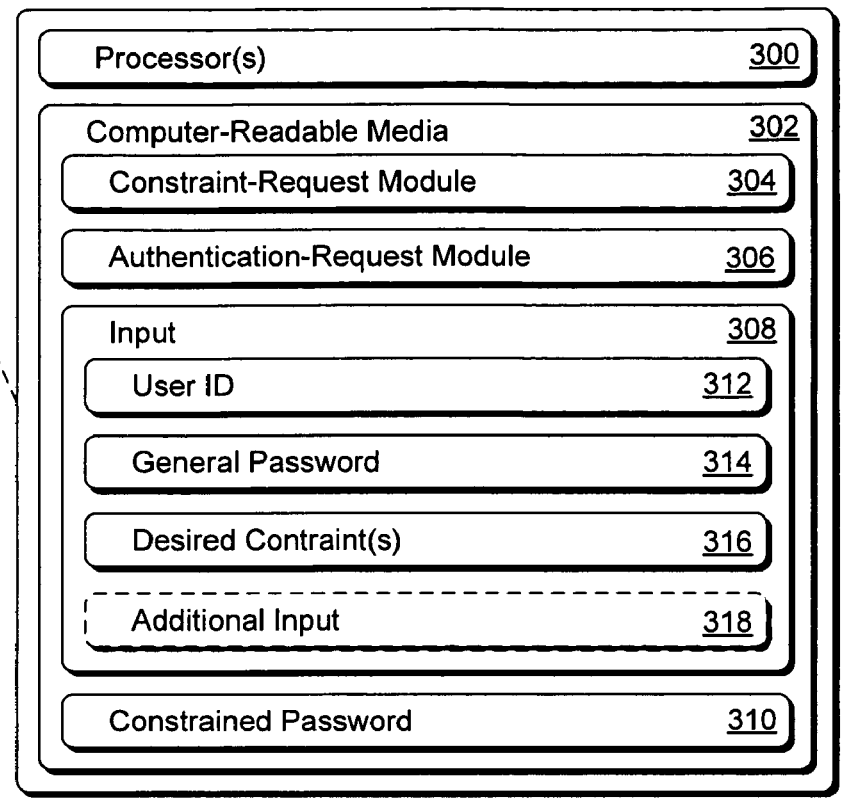
Figure 3:
Figure 3:
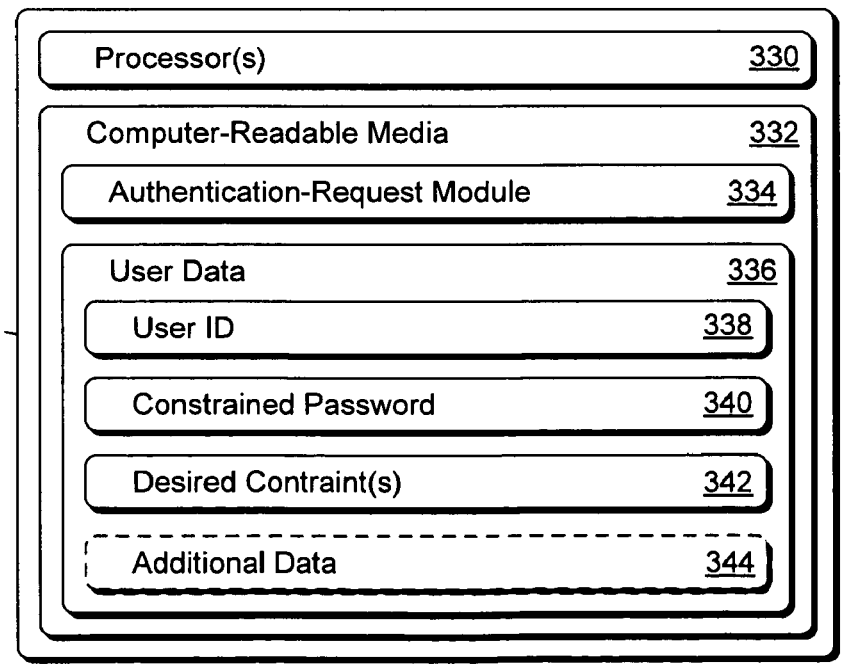

FIG. 3 is a more-detailed illustration of computing devices 106 and 108. Computing device 106 includes one or more processors 300 and computer-readable media 302. The computer-readable media 302 contains a constraint-request module 304, an authentication-request module 306, input 308, and a constrained password 310. Input 308 may include a user ID 312, a general password 314, one or more desired constraints 316, and optional additional input 318. User ID 312 is a username, account number, or other account identifier associated with a particular account. General password 314 is a general password associated with the account that, when used to authenticate, may provide full access to resources associated with that particular account. General password 314 can be in the form of plain text or the result of a cryptographic algorithm performed on a plain text password, to name a few.

One or more desired constraints 316 may include text, text in a constraint specification language, or an index, handle, or pointer describing or pointing to a description of one or more limitations placed on the full account access. An example of such limitations is a time and/or date range during which access is valid, e.g., the tools may grant access to transfer funds but only for 24 hours. Another example of such limitations is access to a subset of systems or subsystems, such as access to an online music store but not to a bank account or access to certain folders or files within a file server but not all the files to which the account may have access. Another example of the described limitations is access to a subset of feature(s) of a system or subsystem. For instance, access can be granted to listen to streaming music but not to purchase and download music, or access can be granted to allow reading files but not allow deletion or modification. Another example of the described limitations includes an additional limitation placed on the subset of feature(s). For instance, the tools may grant access to purchase up to 3 songs or specify a maximum dollar amount for withdrawal from a bank account. Access can be granted to purchase and download music but only having a certain category or maturity rating.

Additional input 318 can include a timestamp, a random number or bit string, other user information, version information, or other information. Constrained password 310 is a password that provides access to a subset of the set of access rights associated with the account's general password 314.

Constraint-request module 304 is capable of generating the constrained password 310. The constraint-request module 304 may do so using a cryptographic algorithm performed on input 308 to output the constrained password 310. The cryptographic algorithm may be a one-way-transformation algorithm or other algorithms known in the art, such as a cryptographic hash. Constrained password 310 may be saved in computer-readable media 302 so that the user does not need to remember it. Since the constrained password 310 and not the general password 314 is saved, a malicious actor that gains access to the computing device 106 will have constrained rights but not all the rights associated with the account.

Authentication-request module 306 is capable of requesting constrained account access to one or more protected entities 216, such as by sending an authentication request. The authentication request may include the user ID 312, the desired constraint(s) 316, the constrained password 310, and any additional input 318 to the authentication module 204 in computing device 102. Authentication-request module 306 is capable of requesting full account access to one or more protected entities 216. Full account access includes access rights that include all rights of the account. Constrained account access is a subset of full account access. This full account access can be requested by sending an authentication request including the user ID 312 and the general password 314 to the authentication module 204. The authentication module 204 validates the authentication request against user account information 206.

The aforementioned information attached to the authentication request may be grouped into two parts, the User ID and the Password parts. The User ID part includes the user ID. The Password part includes either the general password 314 or the constrained password 310 and input 308 (minus the general password 314). In some cases the password part includes two or more of constrained password 310, user ID 312, one or more desired constraints 316, or optional additional input 318.

The validation operation can be implemented in various different ways. The authentication module 204 can re-perform the cryptographic algorithm used by constraint-request module 304 to generate a constrained password. The authentication module 204 can then compare the newly generated constrained password with the provided constrained password 310 and, if they match, grant access to the subset of access rights described by the one or more desired constraints 316. If a valid general password 314 is provided, however, full account access can be granted. In some cases the tools may store the desired constraint(s) with their associated constrained password in the user account information 206. Optionally, the result of a cryptographic transformation of the constrained password can be also or instead stored. Upon receiving an authentication request, authentication module 204 can compare the received constraint(s) and constrained password with the stored constraint(s) and constrained password and grant access if they match.

Computing device 108 includes one or more processors 330 and computer-readable media 332. Computer-readable media 332 contains an authentication-request module 334 and user data 336. User data 336 includes a user ID 338, a constrained password 340, one or more desired constraints 342, and optional additional data 344. User ID 338, constrained password 340, desired constraint(s) 342, and additional data 344 are similar or identical to user ID 312, constrained password 310, desired constraint(s) 316, and additional input 318, respectively. Authentication-request module 334 is capable of requesting constrained account access to one or more protected entities 216 by sending an authentication request including the user data 336 to the authentication module 204 in computing device 102. The authentication module 204 validates the authentication request using user account information 206.

Computing devices 106 and 108 may perform different operations as part of authentication. Computing device 106 may both generate the constrained password 310 and use it to authenticate. Computing device 108, in contrast, receives user data 336 including constrained password 340 from another computing device, such as computing device 106. Computing device 108 may use that user data 336 to authenticate. Constrained password 340 may be saved in computer-readable media 332 so that the user does not need to remember it. Since the constrained password 340 and not a general password, such as general password 314, is saved, a malicious actor that gains access to the computing device 108 will only have constrained rights and not all the rights associated with the account. Computing devices 106 and 108 can be any type of computing device, such as a desktop computer, a notebook computer, a media player, or a wireless phone.

Note that one or more of the entities shown in FIGS. 1, 2, and 3 may be further divided, combined, and so on. For instance, computing devices 102, 104, and 106 may be the same computing device. Constraint-request module 304 may request a constrained password 310 from authentication-module 204 instead of generating the constrained password 310 locally. Thus the environment 100 of FIG. 1 illustrates some of many possible environments capable of employing the described techniques.

Generally, any of the functions described herein can be implemented using software, firmware, hardware (e.g., fixed-logic circuitry), manual processing, or a combination of these implementations. The terms "tool" and "module," as used herein generally represent software, firmware, hardware, whole devices or networks, or a combination thereof. In the case of a software implementation, for instance, a module may represent program code that performs specified tasks when executed on a processor (e.g., CPU or CPUs). The program code can be stored in one or more computer-readable memory devices, such as computer-readable media 202, 212, 302, and/or 332. The features and techniques of the tools are platform-independent, meaning that they may be implemented on a variety of commercial computing platforms having a variety of processors.

Example Process for Constraining a Login to a Subset of Access Rights

The following discussion describes ways in which the tools may operate to enable a login to have constrained access rights. Aspects of this and any other processes may be implemented in hardware, firmware, or software, or a combination thereof. These processes are shown as a set of blocks that specify operations performed by the tools, such as through one or more modules or devices and are not necessarily limited to the order shown for performing the operations by the respective blocks. In portions of the following discussion reference may be made to environment 100 of FIG. 1 as well as FIG. 2 and FIG. 3.

Figure 4:
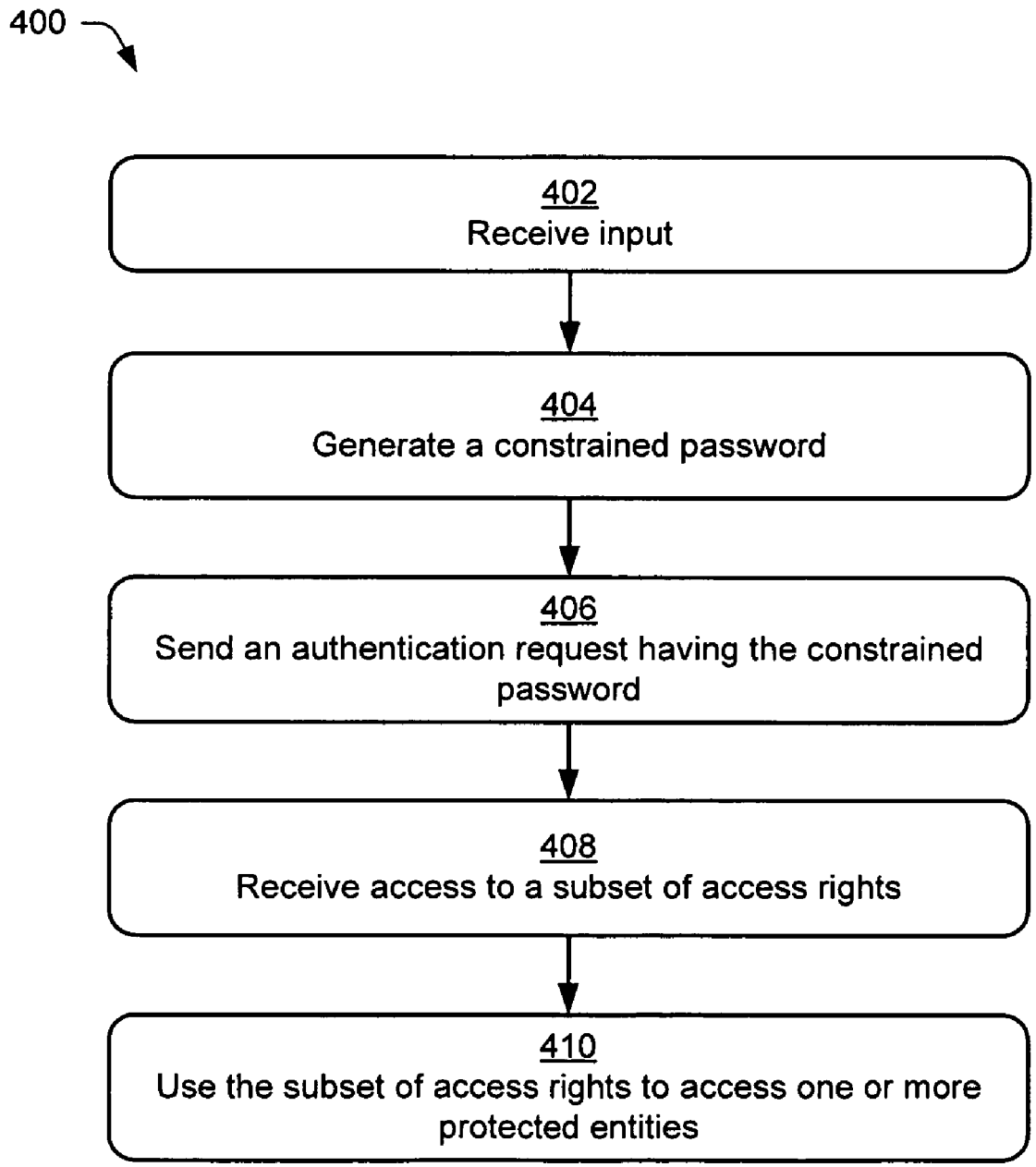
FIG. 4 is a flow diagram depicting an example process, including constraining login credentials by generating and using a constrained password.

FIG. 4 is a flow diagram depicting an example process 400, which includes constraining login credentials by generating and using a constrained password. An example user interface and system layout is described as part of this example process, though other user interfaces and system layouts are also contemplated.

Block 402 receives input. The input may be received via a user entering information, by loading pre-saved information, or by receiving the information from an external source, to name a few. This input may include any of those described above, such as input 308 and user data 336.

Figure 5:
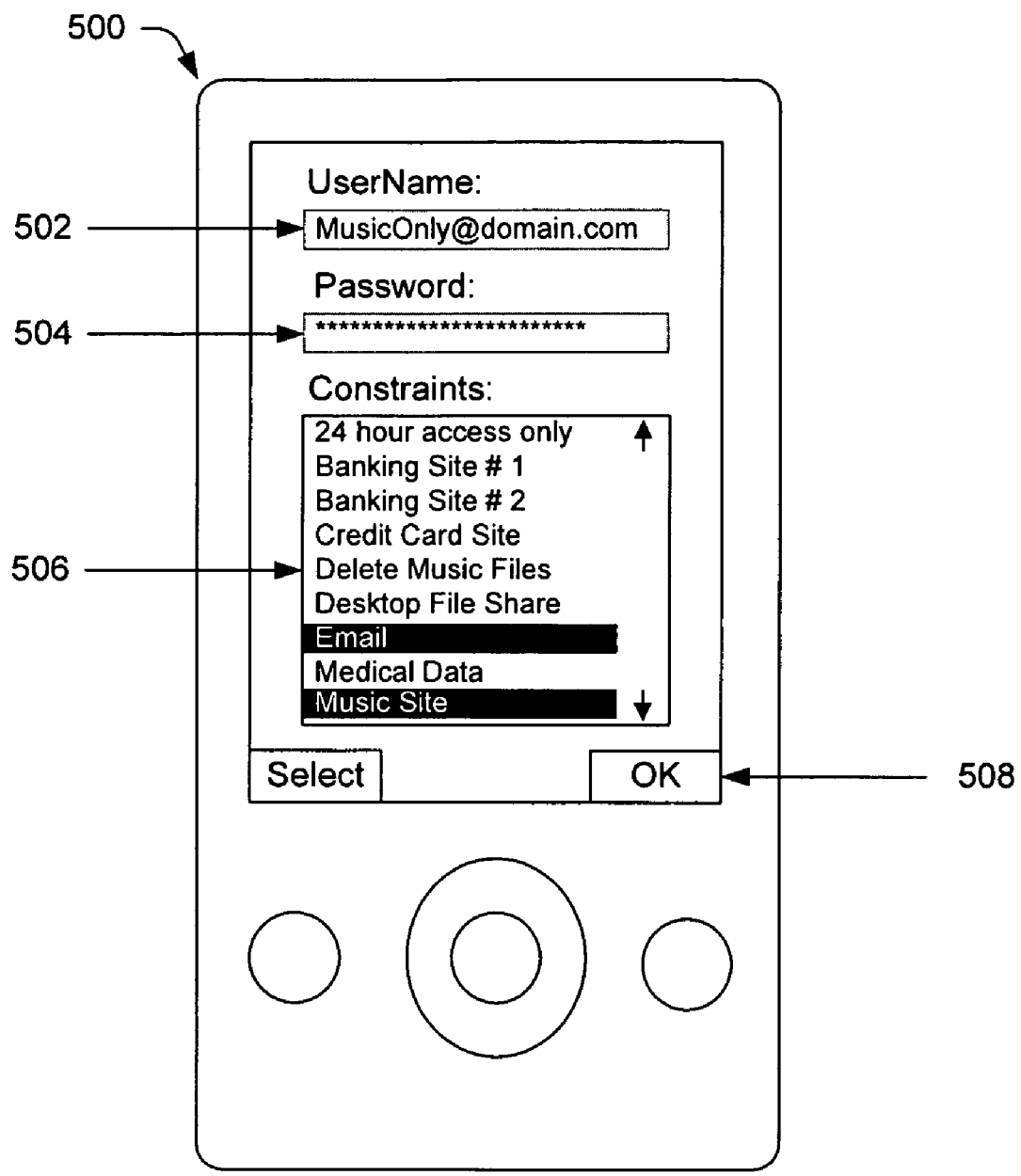
FIG. 5 is an illustration of an example computing device and user interface for implementing at least part of the process of FIG. 4.

By way of example, consider FIG. 5, which illustrates a computing device 500 with a user interface for receiving such input. In this example, a user of computing device 500 enters a user ID in textbox 502, in this case an e-mail address. The user ID may be a number or text representing a user account (e.g., user ID 312 or 338 of FIG. 3). In textbox 504 the user enters a general password (e.g., general password 314 of FIG. 3). The general password is a password associated with a user account represented by the user ID. The general password is configured to give access to a set of privileges associated with the user account.

In list box 506 the user selects one or more desired constraints. The one or more desired constraints, when applied to access rights associated with the user's account, define access rights that have a subset of privileges compared to the full set of access rights associated with the user's account. In this case the user selects "Music Download Site" and "Email" as his or her desired constraints from a media-player device. Note that if a thief steals the user's media-player device he will only have access to purchase and download music and access to the user's email. The thief will not have access to the user's banking accounts, credit cards, shared desktop files, medical data, or the ability to delete music files on the media-player device.

Upon selecting the OK option 508, the received input can be used at block 404. Block 404 generates a constrained password with or based on the user input, such as constrained password 310 and input 308, respectively. The user input may also include optional additional input, such as additional data 344 of FIG. 3.

The general password, which is comprised of plaintext in our example, may be subjected to a cryptographic algorithm prior to generating a constrained password such that the product of the cryptographic algorithm, rather than the plain text password, is used as input for generating the constrained password. Generating the constrained password may be performed by constraint-request module 304 in any of the manners set forth above. Doing so may involve executing a cryptographic algorithm on the input and receiving the constrained password as the output from the algorithm. The cryptographic algorithm may be a one-way-transformation algorithm. The constrained password is used rather than the general password, which limits access to rights associated with the constrained password. In cases where the constrained password is compromised some of the access rights associated with the user's account may be safe.

Block 406 sends an authentication request having the constrained password. Block 406 may do so immediately after block 404 or may wait for some event, such as a successful connection to a network or computing device attempting to access a protected entity that requires authentication. The authentication request may also include or be based on the user ID and the desired constraints, such as those shown in FIG. 3. The authentication request optionally includes additional input, such as that included in the examples above. Continuing the ongoing example, if the user did not select anything in list box 506, block 406 can include the user's user ID and general password in the authentication request.

Block 408 receives access to a subset of access rights. The subset of access rights has a subset of privileges compared to the set of access rights associated with the user's account. The subset of access rights is configured to give at least partial access to one or more protected entities, such as protected entity 216 of FIG. 2. It should be noted that the authentication request may be sent to some local or remote entity, such as authentication module 204 of FIG. 2. The access received may grant access to one or more protected entities, which may be located on the same computing device (e.g., device 500 of FIG. 5), located together on a network connected computing device, or located separately on two different network-connected computing devices. In the above example relating to FIG. 5, the access rights include access to the music download site and the user's email. Alternatively or additionally, receiving access to the subset of access rights may differ from or include more than receiving a message; receiving access can be gaining that access and/or receiving an indication of such access being granted.

Block 410 uses the subset of access rights to access the one or more protected entities. Continuing the ongoing example, the computing device 500 may use the constrained password and other information to authenticate to a remote single-sign-on service. Because the user specified access limited to the music download site and his email, the access rights received from the single-sign-on service are limited to his email and the music website. When the user visits the music website, a protection module, such as module 214, on the music website may ensure that he has been granted access rights before allowing him to purchase and download music to his computing device 500. If a thief steals computing device 500 and visit the user's banking website the thief is not be granted access because the constrained password was used.

Example Process Using a Supplied Constrained Password

Figure 6:
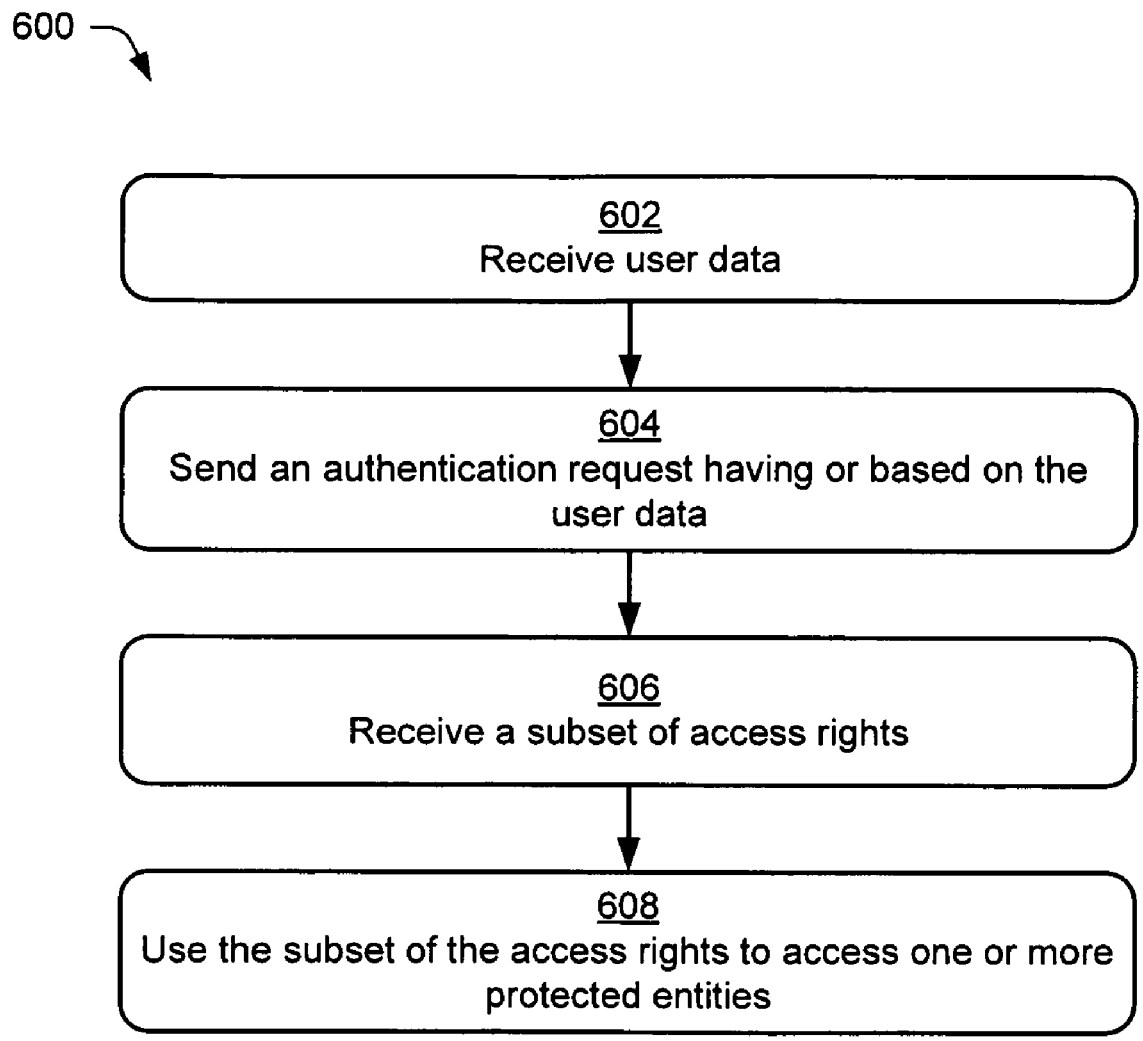
FIG. 6 is a flow diagram depicting an example process in which the tools constrain login credentials using a supplied constrained password.

FIG. 6 depicts a process 600 in which the tools constrain login credentials by using a supplied constrained password. An example user interface and system layout is described as part of this example process, though other user interfaces and system layouts are also contemplated.

Figure 7:
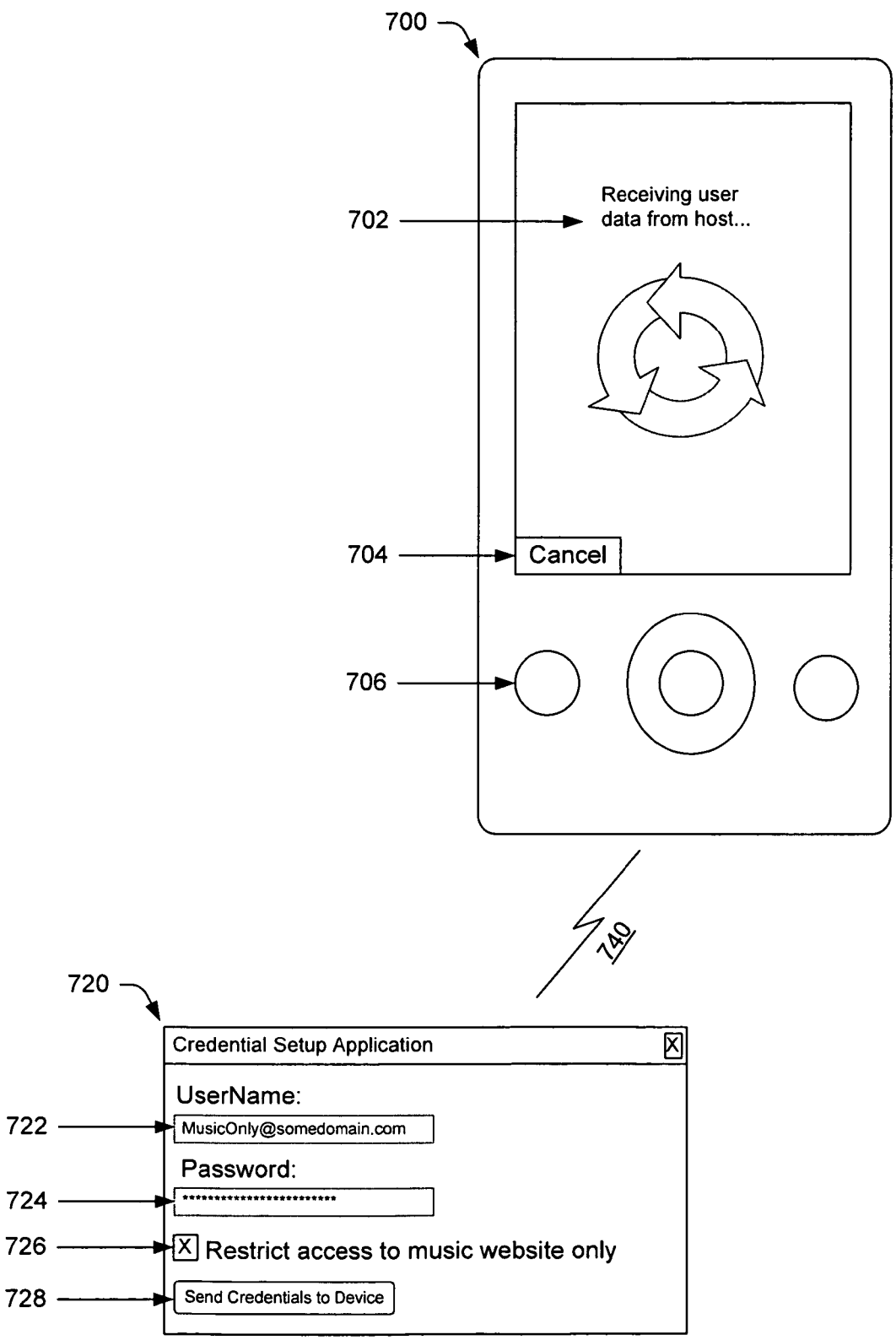
FIG. 7 is an illustration of an example computing device and user interfaces that may be used as part of the process of FIG. 6.

Block 602 receives user data, such as user data 336 of FIG. 3. The user data may be received from another device or loaded from saved data. By way of example, consider FIG. 7, which illustrates a computing device 700 with a user interface for receiving user data from another computing device. Application 720 of FIG. 7 includes a user interface running on the other computing device. The computing device 700 and the other computing device have a communication link 740 between each other.

Application 720 is similar to the user interface of device 500 in the previous example. The user enters his user ID in text box 722, general password in text box 724, and selects desired constraints in checkbox 726. If checkbox 726 is checked a constraint is chosen that restricts access to the music website only. If checkbox 726 is unchecked, no constraints are chosen and this process does not apply as the user ID and general password are used to authenticate and gain non-constrained access (i.e. full account access). The checkbox user interface is a different user interface for selecting desired constraints than previously shown. In no way are these two example user interfaces meant to limit the scope of user interfaces possible to be used with the tools. Other example user interfaces for selecting the desired constraint(s) may include: a text box for plain-text definitions of constraint(s); a button to open another user interface that shows the user account's access rights and allows selection of a subset of those rights to deny or allow; or no user interface at all if the desired constraints are pre-determined.

Responsive to selection of button 728 the application 720 generates a constrained password and sends user data to computing device 700. Such user data includes the user ID, one or more desired constraints, the generated constrained password, as well as optional additional data (if any). In this example the application 720 may act similarly to or include constraint-request module 304 of FIG. 3. The user data is received over communication link 740. Device 700 is different from device 500 at least because generating the constrained password is delegated to the other computing device running application 720. The constrained password may be saved in computer-readable media so that the user does not need to remember it. Since the constrained password and not the general password is saved, a thief that gains access to the computing device 700 will only have constrained rights and not all the rights associated with the account.

Block 604 sends an authentication request having or based on the user data, after which block 606 receives access rights (e.g., from authentication module 204). Block 608 may then use the subset of access rights to access one or more protected entities. Blocks 604, 606, and 608 are similar or identical to blocks 406, 408, and 410 of FIG. 4 respectively. One difference between these two examples is that the user has restricted access to only the music website in FIG. 7 but in FIG. 5 the user has access to the user's email account as well. Thus, if a thief steals computing device 700 the thief may have access to the music website but not to the user's banking website or the user's email.

Example Process for Authenticating a Constrained Login

Figure 8:
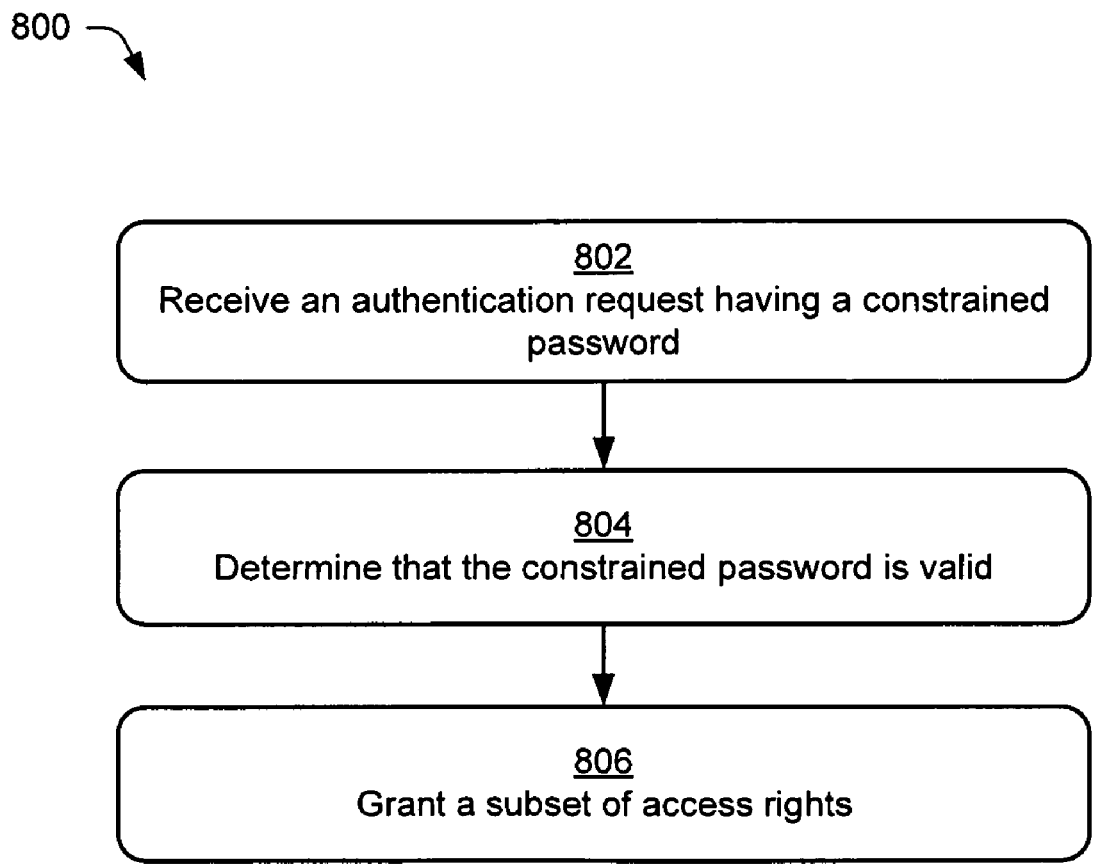
FIG. 8 is a flow diagram depicting an example process by which a constrained login may be authenticated.

FIG. 8 is a flow diagram depicting an example process 800 by which a constrained login may be authenticated. An example system layout is described as part of this example process, though other system layouts are also contemplated.

Block 802 receives an authentication request having a constrained password. This authentication request can be received over a network or generated locally. The authentication request may be sent from a computing device such as computing device 106 or 108 of FIG. 3, computing device 500 of FIG. 5, or computing device 700 of FIG. 7. The authentication request may also include or be based on a user ID, one or more desired constraints, and/or any optional additional data used to generate the constrained password.

Block 804 determines that the constrained password is valid. Block 804 may determine that it is not valid, though in this case the process does not proceed to block 806. Block 804 can be accomplished in many different ways. A few such ways are described in the description of the validation performed by authentication module 204 above. Block 806 grants a subset of access rights that have a subset of privileges as defined by the one or more desired constraints. The subset of access rights give access to one or more protected entities for which the computing device running process 800 has authentication responsibilities. Such protected entities (e.g., protected entity 216 of FIG. 2) may be on the same computing device that is executing process 800 or on a separate but accessible computing device.

CONCLUSION

This document describes tools capable of constraining a login to a subset of access rights. The tools may provide a user with a secure way to login to the user's account to gain access to a subset of access rights rather than a full set of access rights associated with the user's account. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
generating, by a first computing device, a constrained password by at least executing a one-way-transformation algorithm on a product of a cryptographic algorithm executed on a general password that is associated with a user account, the execution of the one-way-transformation algorithm providing an output that includes the constrained password, the constrained password being based on one or more constraints defining a subset of access rights of a full set of access rights associated with the user account;
sending an authentication request including the constrained password to a second computing device capable of authenticating the user account; and
receiving, from the second computing device, access to the subset of access rights.

2. The method as recited in claim 1, wherein the access to the subset of access rights grants access to a resource, the access to the resource based on the one or more constraints.

3. The method as recited in claim 1, wherein the one-way-transformation algorithm comprises a cryptographic hash.

4. The method as recited in claim 1, wherein the authentication request includes a user identifier (ID) and wherein the act of generating comprises executing the one-way-transformation algorithm also on the user ID and one or more of a time stamp, a random number or bit string, user information, or version information.

5. The method as recited in claim 1, wherein the general password is plain text.

6. The method as recited in claim 1, further comprising receiving the general password and the one or more constraints from a remote device.

7. The method as recited in claim 6, wherein the one or more constraints define access rights that are limited by a time or date range in which access is valid, a system or subsystem to which access is limited, a feature of the system or subsystem to which access is limited, or a limitation on the feature to which access is limited.

8. The method as recited in claim 6, wherein the one or more constraints are described in plain text, described in a constraint specification language, an index to another constraint, a handle to another constraint, or a pointer to another constraint.

9. The method as recited in claim 1, wherein the subset of access rights is configured to give at least partial access to one or more protected entities, each of the one or more protected entities being a local site, service, or system.

10. The method as recited in claim 9, wherein the second computing device is a local authentication module and the one or more protected entities are local.

11. The method as recited in claim 1, wherein the subset of access rights is configured to give at least partial access to one or more protected entities, each of the one or more protected entities being a network-accessible site, service, or system.

12. The method as recited in claim 11, wherein the second computing device is a local authentication module and the one or more protected entities are remote.

13. A computer-implemented method comprising:
receiving, by a computing device, an authentication request comprising:
a user identifier (ID) associated with a user account; and
a constrained password that is based on one or more constraints defining a subset of access rights of a full set of access rights associated with the user account;
determining that the constrained password is valid by at least:
performing a cryptographic algorithm on at least the user ID to generate a new constrained password; and
comparing the new constrained password to the constrained password received in the authentication request to determine a match; and
responsive to determining that the constrained password is valid based on the match, granting the subset of access rights.

14. The method as recited in claim 13, wherein the authentication request further comprises one or more constraints defining the subset of access rights.

15. The method as recited in claim 13, wherein the subset of access rights grant at least partial access to one or more protected entities.

16. The method as recited in claim 15, wherein the one or more protected entities comprise a local site, service, or system.

17. The method as recited in claim 15, wherein the one or more protected entities comprise a network-accessible site, service, or system.

18. The method as recited in claim 13, wherein the authentication request is received from a remote computing device.

19. A computer-implemented method comprising:
receiving input at a computing device, the input comprising:
a user ID;
a general password that is:
associated with a user account represented by the user ID; and
configured to give access to a full set of access rights associated with the user account; and
one or more desired constraints that, when applied to the full set of access rights associated with the user account, define a subset of the full set of access rights;
executing a first one-way cryptographic algorithm on the input to provide a result;
generating a constrained password that is based on the one or more desired constraints, the generating comprising:
executing a second one-way cryptographic algorithm on the result of the first one-way cryptographic algorithm; and
receiving the constrained password as output from the second one-way cryptographic algorithm;
sending an authentication request, the authentication request including the user ID, the one or more desired constraints, and the constrained password; and
receiving access to the subset of the full set of access rights, the subset of the full set of access rights configured to give at least partial access to one or more protected entities.

20. A computer-implemented method as recited in claim 19, further comprising executing an additional cryptographic algorithm on the input prior to generating the constrained password.

* * * * *